United States Patent
Kani et al.

(10) Patent No.: US 7,694,791 B2
(45) Date of Patent: Apr. 13, 2010

(54) DRIVING FORCE TRANSMITTING APPARATUS

(75) Inventors: Masakatsu Kani, Kariya (JP); Akio Matsumoto, Anjo (JP); Toshimi Hara, Takahama (JP); Kunihiko Suzuki, Gamagori (JP); Tsuyoshi Murakami, Handa (JP)

(73) Assignee: JTEKT Corporation, Osaka-shi (JP)

( * ) Notice: Subject to any disclaimer, the term of this patent is extended or adjusted under 35 U.S.C. 154(b) by 271 days.

(21) Appl. No.: 11/508,941

(22) Filed: Aug. 24, 2006

(65) Prior Publication Data

US 2007/0045075 A1 Mar. 1, 2007

(30) Foreign Application Priority Data

Aug. 29, 2005 (JP) ............................. 2005-247638

(51) Int. Cl.
*F16D 27/115* (2006.01)
*F16D 13/04* (2006.01)

(52) U.S. Cl. ........................ 192/35; 192/70.2; 192/84.7; 192/84.961

(58) Field of Classification Search ............... 192/84.96, 192/84.7
See application file for complete search history.

(56) References Cited

U.S. PATENT DOCUMENTS 3,245,508 A 4/1966 Livezey
3,476,228 A * 11/1969 Pritchard ................. 192/107 R
3,680,675 A * 8/1972 Livezey ................... 192/107 R
4,718,303 A * 1/1988 Fogelberg .................... 475/150
6,158,561 A 12/2000 Sakai et al.
6,722,482 B2 4/2004 Takuno
2003/0221927 A1* 12/2003 Showalter et al. ............. 192/35

FOREIGN PATENT DOCUMENTS

| DE | 4439133 | 10/1995 |
|----|---------|---------|
| DE | 19730714 | 1/1998 |
| JP | 11-287258 | 10/1999 |

* cited by examiner

*Primary Examiner*—Richard M. Lorence
(74) *Attorney, Agent, or Firm*—Oblon, Spivak, McClelland, Maier & Neustadt, L.L.P.

(57) ABSTRACT

A driving force transmitting apparatus includes: a first torque-transmitting member having a cylindrical portion and provided with a spline tooth; a second torque-transmitting member positioned inside the cylindrical portion and arranged coaxially rotatably relative to the first torque-transmitting member; a main clutch with a spline tooth; an actuator unit for actuating the main clutch to be engaged; and a controlling device for controlling the actuator unit so as to pressurize the main clutch plate in such a manner that torque is not substantially transmitted between the first torque-transmitting member and the second torque-transmitting member when the engagement of the main clutch is judged to be unnecessary.

1 Claim, 6 Drawing Sheets

DRIVING FORCE TRANSMITTING APPARATUS

CROSS REFERENCE TO RELATED APPLICATIONS

This application is based on and claims priority under 35 U.S.C. § 119 with respect to Japanese Patent Application 2005-247638, filed on Aug. 29, 2005, the entire content of which is incorporated herein by reference.

FIELD OF THE INVENTION

The present invention relates to a driving force transmitting apparatus applicable for a driving force transmitting system for a vehicle.

BACKGROUND

JP1999(11)-287258A discloses a driving force transmitting apparatus by which a driving force is transmitted by engaging a frictional clutch. This driving force transmitting apparatus is mounted on a four-wheel-drive (4WD) vehicle and distributes a driving force of an engine not only to front wheels but also to rear wheels as needed. In this driving force transmitting apparatus, a cam mechanism is operated in response to an actuation or engagement of a pilot clutch so that a main clutch is actuated or engaged by a thrust force generated at the cam mechanism. This main clutch includes outer clutch plates and inner clutch plates. The outer clutch plates are in spline engagement with or are spline-fitted with a first torque-transmitting member that is located outside and is inputted with, for example, a driving force of an engine. The inner clutch plates are in spline engagement with or are spline-fitted with a member configured to transmit a driving force to an auxiliary driving wheel.

Each spline-engaged area between each outer clutch plate and the first torque-transmitting member includes a predetermined amount of backlash (play), and each spline-engaged area between each inner clutch plate and the member for transmitting a driving force to the auxiliary driving wheel includes a predetermined amount of backlash (play). Therefore, an axial directional movement of each outer clutch plate becomes smoother and lubricant flowing between the clutch plates is drained appropriately. When torque is not transmitted from the first torque-transmitting member to the second torque-transmitting member, the main clutch is not at an engaged state. For example, in a case where the driving force transmitting apparatus is applied for connecting and disconnecting a transmission of a driving force to rear wheels of a vehicle, when torque is not outputted to the rear wheels, the main clutch is not engaged. Therefore, the outer clutch plates and the inner clutch plates are not constrained and are allowed to move. As a result, when torque is not transmitted from the first torque-transmitting member to the second torque-transmitting member, the axes of the outer clutch plates and the inner clutch plates of the main clutch correspond to the axes of the first torque-transmitting member and the second torque-transmitting member, wherein the main clutch rotates in an eccentric manner relative to the first and second torque-transmitting members. Therefore, when the driving force transmitting apparatus rotates in accordance with a driving of a vehicle, rotational imbalance may be created and transmitted as vibration to an occupant. The occupant may obtain an unpleasant and unstable feeling.

The present invention has been made in view of the above circumstances, and provides a driving force transmitting apparatus, which prevents a looseness of outer clutch plates and inner clutch plates of a clutch assembly and reduce a degree of rotational imbalance even when torque is not transmitted between a first torque-transmitting member and a second torque-transmitting member.

SUMMARY OF THE INVENTION

According to an aspect of the present invention, a driving force transmitting apparatus, includes: a first torque-transmitting member having a cylindrical portion; a second torque-transmitting member positioned inside the cylindrical portion of the first torque-transmitting member and arranged coaxially with and rotatably relative to the first torque-transmitting member; a main clutch having a main outer clutch plate in spline mated with an inner circumferential surface of the cylindrical portion of the first torque-transmitting member and a main inner clutch plate in spline mated with an outer circumferential surface of the second torque-transmitting member, the main clutch being actuated to connect and disconnect a transmission of torque between the first torque-transmitting member and the second torque-transmitting member, an actuator unit for actuating the main clutch to be engaged; and a controlling device for judging based on a driving condition of a vehicle whether an engagement of the main clutch is necessary or not and controlling the actuator so as to actuate the main clutch when the engagement of the main clutch is judged to be necessary. A spline tooth of the main outer clutch plate and a spline tooth of the inner circumferential surface of the cylindrical portion of the first torque-transmitting member each have a trapezoidal profile in a circumferential direction with a root circle of the tooth being longer than a tip circle of the tooth. Alternatively or in addition, a spline tooth of the main inner clutch plate and a spline tooth of the outer circumferential surface of the second torque-transmitting member each having a trapezoidal profile in a circumferential direction with a root circle of the tooth being longer than a tip circle of the tooth. The controlling device controls the actuator unit so as to pressurize the main outer clutch plate and the main inner clutch plate in such a manner that torque is not substantially transmitted between the first torque-transmitting member and the second torque-transmitting member when the engagement of the main clutch is judged to be unnecessary.

BRIEF DESCRIPTION OF THE DRAWINGS

The foregoing and additional features and characteristics of the present invention will become more apparent from the following detailed description considered with reference to the accompanying drawings, wherein.

DETAILED DESCRIPTION

An embodiment of the present invention will be described hereinbelow with reference to the attached drawings.

Figure 1:
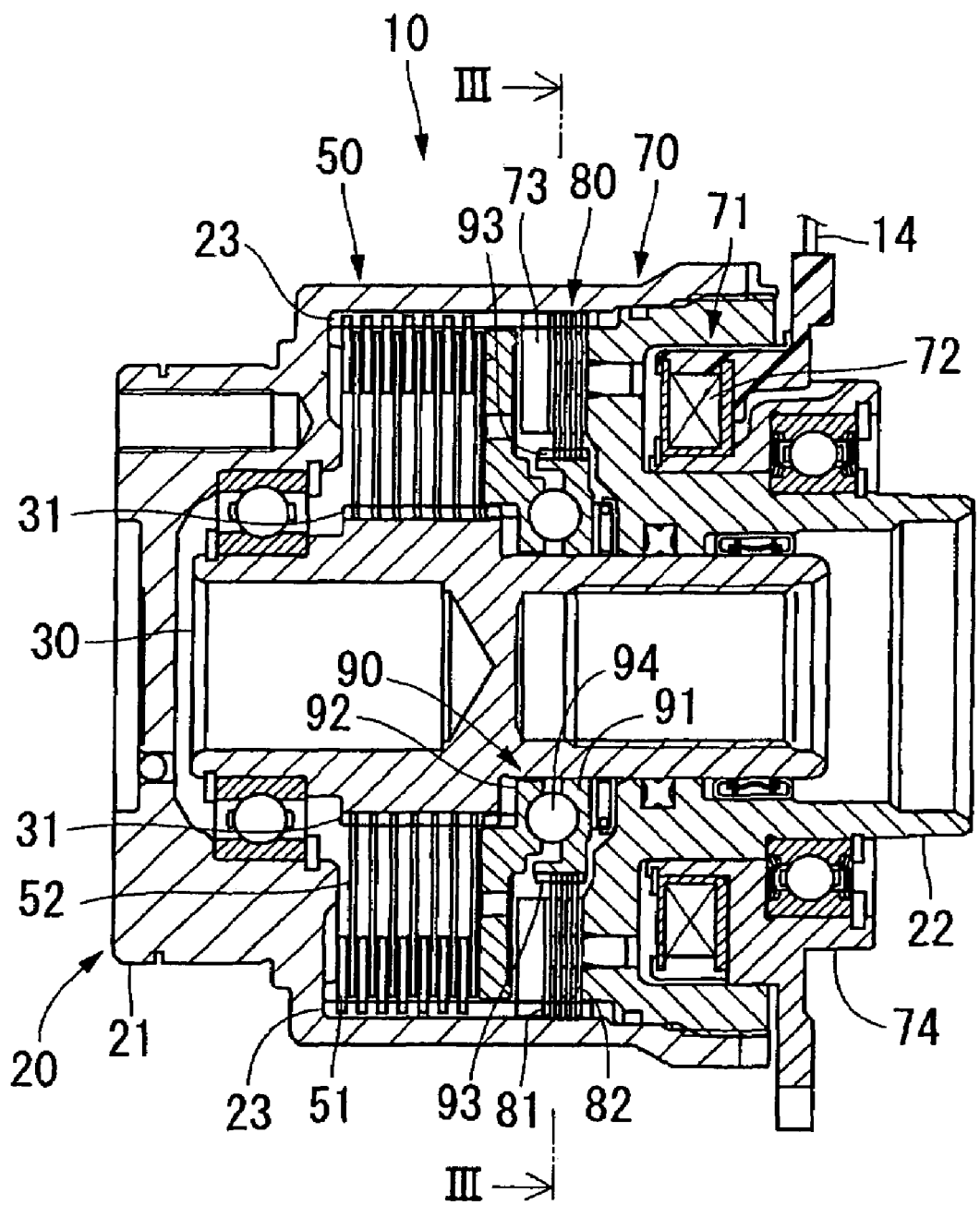
FIG. 1 is a sectional view illustrating a configuration of a driving force transmitting apparatus according to an embodiment of the present invention.
Figure 2:
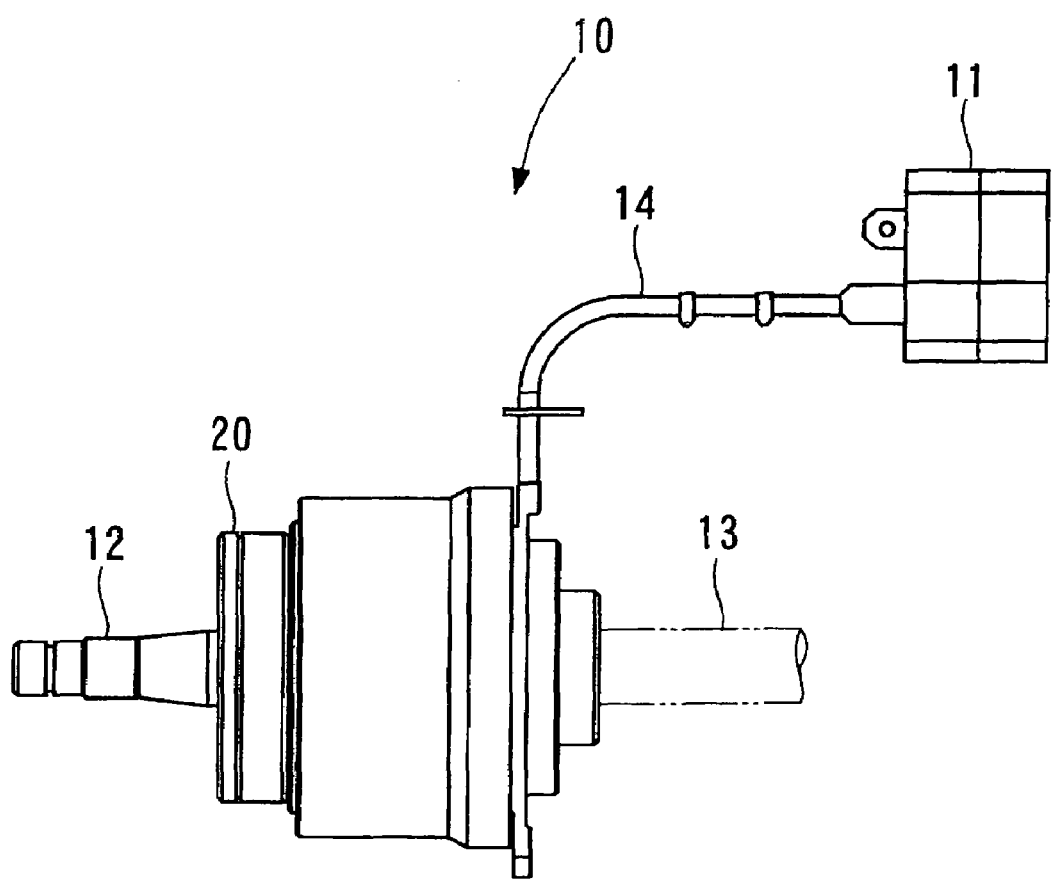
FIG. 2 is a view illustrating a driving force transmitting apparatus according to the embodiment of the present invention.

As illustrated in FIGS. 1 and 2, a driving force transmitting apparatus 10 according to the embodiment of the present invention distributes torque outputted from an engine (not illustrated) to rear wheels that act as auxiliary driving wheels. More specifically, when the driving force transmitting apparatus 10 is mounted on a 4WD vehicle in which front wheels act as main driving wheels, torque outputted from an engine is normally transmitted to the front wheels. Once rear wheels are required to be transmitted with the engine torque, the driving force transmitting apparatus 10 distributes the engine torque not only to the front wheels but also to the rear wheels. As is illustrated in FIG. 2, the driving force transmitting apparatus 10 includes a controller 11 that is configured to control torque to be distributed to rear wheels of a vehicle. The controller 11 corresponds to a controlling means which controls, in response to a driving condition of a vehicle such as a rotational speed of each wheel of the vehicle, a speed of the vehicle, an opening degree of a throttle valve, a steering angle of a steering wheel, and so on, torque to be distributed to the auxiliary driving wheels.

Going back to FIG. 1, the driving force transmitting apparatus 10 further includes: an outer case 20; a inner shaft 30; a main clutch 50; an actuator unit 70; and a cam mechanism 90. The outer case 20 is configured with a front housing 21 and a rear housing 22. The front housing 21 of the outer case 20 includes a bottom portion, which is illustrated at the left side in FIG. 1, and a cylindrical portion (hollow), with which each clutch plate are in spline engagement. The bottom portion of the front housing 21 is connected with an end of a propeller shaft 12 illustrated in FIG. 2. The propeller shaft 12 is linked to an output side of an engine (not illustrated) at the other end thereof. Therefore, engine torque is transmitted to the driving force transmitting apparatus 10 via the propeller shaft 12. The outer case 20 hence corresponds to a first torque-transmitting member.

As is obvious from FIG. 1, the inner shaft 30 penetrates the rear housing 22 of the outer case 20 and inserted into the front housing 21. The inner shaft 30 is prohibited from moving in an axial direction (right and left direction in FIG. 1) and is supported coaxially with, and rotatably relative to the front housing 21 and the rear housing 22. The inner shaft 30 is connected to a drive pinion shaft 13 at an end of the inner shaft 30, which is arranged at an opposite side of the propeller shaft 12 (at the right side in FIG. 2). The drive pinion shaft 13 is connected to a differential gear unit which is located near rear wheels and is not illustrated. Therefore, engine torque travels, via the inner shaft 30 in the driving force transmitting apparatus 10 and the drive pinion shaft 13, to the differential gear unit at the rear wheel side. The inner shaft 30 hence corresponds to a second torque-transmitting member.

The main clutch 50 is a wet-type multiple frictional clutch. As illustrated in FIG. 1, the main clutch 50 is configured with plural main outer clutch plates 51 and main inner clutch plates 52. The main clutch 50 is housed inside the cylindrical portion of the front housing 21. Outer peripheries of the main outer clutch plates 51 are each in spline mated with splines 23 defined at an inner circumferential surface of the front housing 21. Therefore, the main outer clutch plates 51 are movable in the axial direction. Meanwhile, inner peripheries of the main inner clutch plates 52 are each in spline mated with splines 31 defined at an outer circumferential surface of the inner shaft 30. Therefore, the main inner clutch plates 52 are movable in the axial direction. The main outer clutch plates 51 and the main inner clutch plates 52 are arranged alternately along the axial direction of the driving force transmitting apparatus 10. The main clutch 50 is frictionally engaged when the main outer clutch plates 51 contact with the main inner clutch plates 52, respectively. On the other hand, the main clutch 50 becomes freely rotatable, i.e., is released from a frictionally engaged state, when the main outer clutch plates 51 and the main inner clutch plates 52 are released from the contacted state.

The actuator unit 70 is configured with an electromagnetic actuator 71; a pilot clutch 80; and a cam mechanism 90. The electromagnetic actuator 71 includes: at least one coil 72 forming into an electromagnet; and an armature 73. The coil 72 exhibits an approximately ring-shaped structure and is located in an annular-shaped recessed portion defined at the rear housing 22 of the outer case 20. The coil 72 is rotatably supported at the rear housing 22 via a yoke 74 made of magnetic material. The armature 73 is located at an opposite side to the coil 72 relative to the pilot clutch 80.

As well as the coil 72, the armature 73 exhibits an approximately ring-shaped structure. An outer periphery of the armature 73 is in spline engagement with the spline 23 defined at the inner circumferential surface of the front housing 21. Therefore, the armature 73 is movable in the axial direction. The coil 72 is connected to the controller 11 via a cable 14. The controller 11 controls electric current to be supplied to the coil 72. Once the controller 11 electrically excites the coil 72, a magnetic field is generated. A magnetic circuit is then formed not only at the rear housing 22 and the yoke 74, which both surround the coil 72, but also at the pilot clutch 80 and the armature 73. Therefore, in response to an electric current supply to the coil 72, magnetic attractive force is generated between the rear housing 22 and the armature 73 so that the armature 72 moved towards the coil 72.

The pilot clutch 80 is arranged between the coil 72 and the armature 73. The pilot clutch 80 is a wet-type multiple frictional clutch as well as the main clutch 50. The pilot clutch 80 includes plural pilot outer clutch plates 81 and plural pilot inner clutch plates 82. The pilot outer clutch plates 81 are in spline engagement with the splines 23 defined at the inner circumferential surface of the front housing 21. Therefore, the pilot outer clutch plates 81 are movable in the axial direction. The pilot inner clutch plates 82 are in spline engagement with splines 93 defined at an outer circumferential surface of a first cam member 91 of the cam mechanism 90. Therefore, the pilot inner clutch plates 82 are movable in the axial direction. The pilot clutch 80 is frictionally engaged when the pilot outer clutch plates 81 contact with the pilot inner clutch plate 82. On the other hand, the pilot clutch 80 becomes freely rotatable, i.e., is released from a frictionally engaged state, when the pilot outer clutch plates 81 and the pilot inner clutch plates 82 are released from the contacted state.

Figure 3:
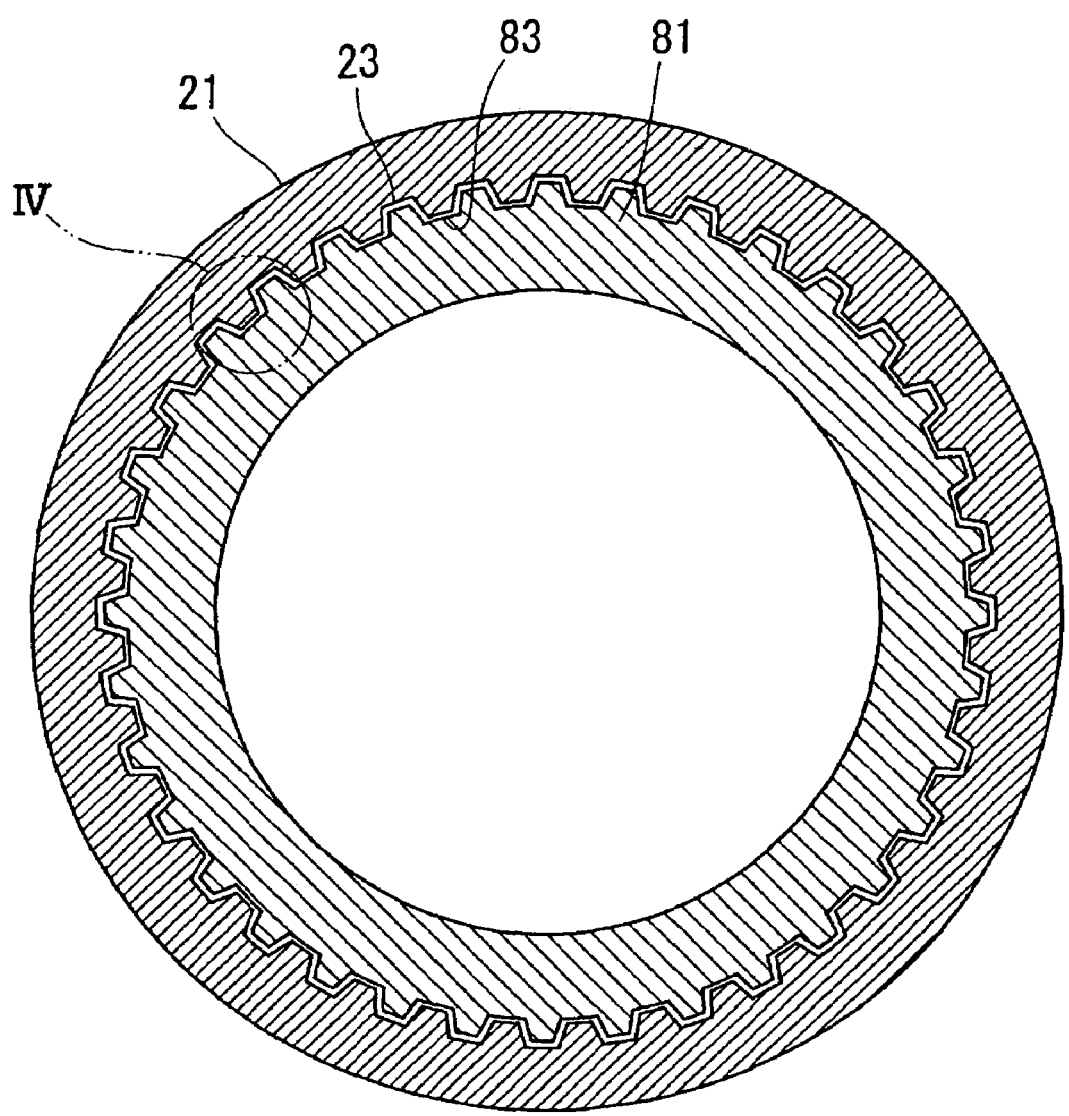
FIG. 3 is a sectional view taken along line III-III in FIG. 1 and illustrating an outer clutch plate of a frictional clutch and an outer case.

As illustrated in FIG. 3, each pilot outer clutch plate 81 is formed with or is provided with splines 83, while the front housing 21 of the outer case 20 is formed with or provided with the splines 23. More particularly, the splines 83 are arranged at an outer periphery of each pilot outer clutch plate 81, while the splines 23 are arranged at an inner periphery of the front housing 21. The splines 83 of each pilot outer clutch plate 81 are meshed with the splines 23 of the front housing 21 in such a manner that each pilot outer clutch plate 81 is movable in the axial direction relative to the front housing 21.

Figure 4:
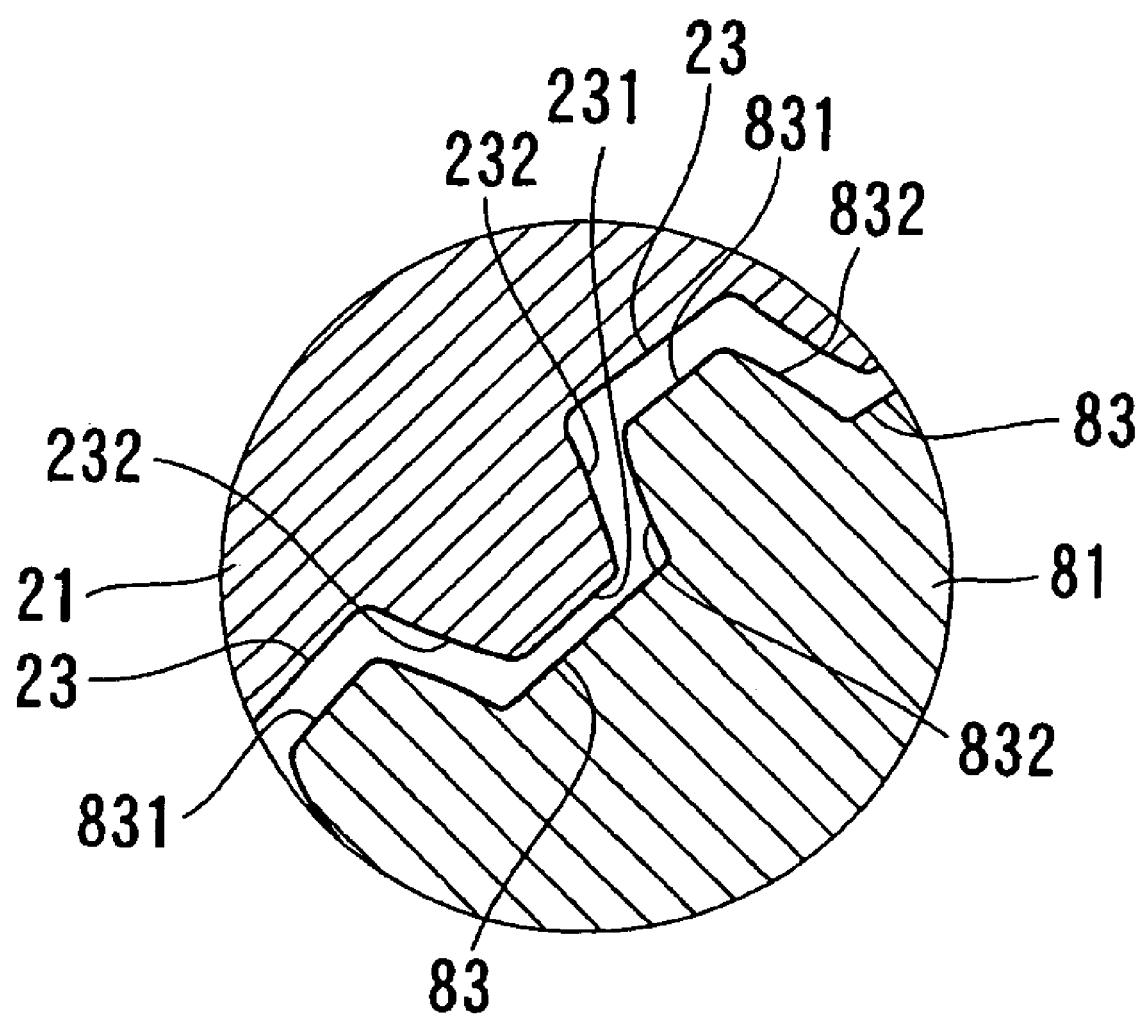
FIG. 4 is an enlarged view illustrating a portion denoted with IV in FIG. 3.

Each spline 83 of the pilot outer clutch plate 81 and each spline 23 of the front housing 21 exhibits an approximately trapezoidal profile in a circumferential direction with a root circle of a spline tooth being longer than a tip circle of the spline tooth. More particularly, each spline 83 and 23 forms an involute curve. That is, as illustrated in FIG. 4, the spline 83 of the pilot outer clutch plate 81 includes a spline tooth 831 projecting radially outwardly and wall surfaces 832 extending from both circumferential ends of the spline tooth 831. The spline 23 of the front housing 21 includes a spline tooth 231 projecting radially inwardly and wall surfaces 232 extending from both circumferential ends of the spline tooth 231. The wall surface 832 and 232 each form an involute curve.

Splines defined at an inner periphery of each pilot inner clutch plate 82 and splines 93 defined at an outer periphery of the first cam member 91 each form an involute curve in the same manner as the splines 83 of the pilot outer clutch plate 81 and the splines 23 of the front housing 21.

The cam mechanism 90 includes the first cam member 91, a second cam member 92, and cam balls 94. Cam grooves are each formed at a surface of the first cam member 91 and at a surface of the second cam member 92, which faces the surface of the firs cam member 91. The cam balls 94 are each housed in a space defined by the cam groove of the first cam member 91 and the second cam member 92. The first cam member 91 is rotatably attached to an outer circumferential surface of the inner shaft 30 and is rotatably supported by the rear housing 22. As described above, the first cam member 91 includes, at an outer periphery, the splines 93 with which the pilot inner clutch plates 82 are in spline mated. The second cam member 92 is in spline engagement with splines 31 defined at an outer circumferential surface of the inner shaft 30. Therefore, the second cam member 92 is rotatably with the inner shaft 30. The second cam member 92 is arranged facing the main inner clutch plate 52 in the axial direction.

The driving force transmitting apparatus 10 is provided with the cable 14 which electrically connects the controller 11 to the coil 72. The cable 14 is connected, at one end, to the coil 72 and is connected, at the other end, to the controller 11. The controller 11 controls an amount of electric current to be supplied to the coil 72, based on a command of an integrated ECU (not illustrated) controlling integrally an entire system associated with a vehicle on which the driving force transmitting apparatus 10 is mounted. The controller 11 is a microcomputer which is mainly configured with a central processing unit (CPU), a read-only-memory (ROM) and a random-access-memory (RAM), which all are not illustrated. The integrated ECU, which is not illustrated, determines, on the basis of a driving condition such as a speed of a vehicle, an instruction from an operator of a vehicle, or the like, an optimum ratio at which torque is distributed to front wheels and rear wheels. The integrated ECU then outputs the determined torque ratio as a command signal to the controller 11. The controller 11 determines an amount of electric current to be supplied to the coil 72, on the basis of the command signal representing the optimum torque ratio. As described above, the coil 72 is electrically excited with electric current.

In the driving force transmitting apparatus 10 with the above-described structure, once the coil 72 is supplied with electric current, a magnetic circuit is created at the pilot clutch 80 so that the armature 73 is attracted towards the coil 72. As a result, the pilot clutch 80 of the actuator unit 70 is frictionally engaged. More specifically, as the armature 73 is attracted towards the coil 72, the armature 73 applies a pushing force to the pilot clutch 80, and so the pilot outer clutch plates 81 and the pilot inner clutch plates 82 are frictionally engaged. Therefore, the first cam member 91 of the cam mechanism 90 is coupled to the front housing 21 so that a relative rotation between the first cam member 91 and the second cam member 92, i.e., a differential is generated. As a result, in the cam mechanism 90, the cam balls 94 are operated in a direction that the first cam member 92 and the second cam member 92 are moved away from each other.

Once a force for operating the first cam member 91 and the second cam member 92 is applied therebetween in response to a differential therebetween, the second member 92 is moved towards the main clutch 50. Therefore, the second cam member 92 applies a pushing force to the main clutch 50, and so the main outer clutch plates 51 and the main inner clutch plates 52 are frictionally engaged. The main clutch 50 is controlled at a frictionally engaged state, and a torque is transmitted from the outer case 20 to the inner shaft 30. As a result, torque, which is inputted to the driving force transmitting apparatus 10 from the propeller shaft 12, is transmitted to a drive pinion shaft 13 operatively connected to rear wheels.

Here, a force for engaging the pilot clutch 80 is adjusted by controlling an amount of electric current supplied to the coil 72. Further, a force for engaging the main clutch 50 is adjusted in response to a degree of the force for engaging the pilot clutch 80. Therefore, torque transmitted from the outer case 20 to the inner shaft 30 via the main clutch 50, i.e., torque transmitted from an engine (not illustrated) to rear wheels via the driving force transmitting apparatus 10, is adjusted by controlling an amount of electric current supplied to the coil 72. As a result, a torque ratio, at which torque is distributed to front wheels and rear wheels, is effectively controlled within a range between 100:0 and 50:50. Therefore, the controller 11 and the electromagnetic actuator 71 correspond to a controlling means for controlling a force for engaging.

When the coil 72 of the actuator unit 70 is not electrically excited, the armature 73 is not attracted towards the coil 72. Therefore, the pilot clutch 80 of the actuator unit 70 is not frictionally engaged. Therefore, the pilot clutch 80 is not actuated so that the first cam member 91 of the cam mechanism 90 rotates integrally with the second cam member 92 via the cam balls 94. As described above, when the coil 72 is not electrically excited, the main outer clutch plates 51 are not frictionally engaged with the main inner clutch plates 52, and so torque is not transmitted to the rear wheels.

As illustrated in FIGS. 3 and 4, a predetermined amount of backlash (play) is defined between each spline 83 of the pilot outer clutch plate 81 and each spline 23 of the outer case 20 in such a manner that an operation of each member 81 and 20 can be assured appropriately. Therefore, in the case where the pilot outer clutch plates 81 and the pilot inner clutch plates 82 are frictionally disengaged, the clearance allows each pilot outer clutch plate 81 to move freely in a radial direction. As a result, rattling or looseness may occur at the pilot outer clutch plate 81, which may create an abnormal noise. Likewise, a predetermined amount of backlash (play) is defined between each spline of the pilot inner clutch plate 82 and the spline 93 of the first cam member 91 in the same manner as described above. Therefore, rattling or looseness may occur at the pilot inner clutch plate 82 as well.

In the light of the foregoing, according to the embodiment of the present invention, even when a torque supply to the rear wheels is not needed, the controller 11 supplies electric current to the coil 72 at a low level. The level of electric current to be supplied to the coil 72 by the controller 11 is sufficient to apply a pushing force to the pilot outer clutch plates 81 and the pilot inner clutch plates 82 so that these plates 81 and 82 come in contact together. However, at such low level of electric current supplied to the coil 72, torque transmission between the outer case 20 and the inner shaft 30 is not achieved.

As described above, according to the embodiment of the present invention, a torque ratio, at which torque is distributed to front and rear wheels respectively, is effectively controlled within a range between 100:0 and 50:50 by controlling electric current supplied to the coil 72. The controller 11 hence supplies electric current to the coil 72 at a level according to which a torque distribution ratio for front and rear wheels is maintained substantially at 100:0. Therefore, the armature 73 is attracted to the coil 72 and the pilot clutch 80 is engaged gradually.

In this case, a force for engaging the pilot outer clutch plates 81 and the pilot inner clutch plates 82 measures a low degree which corresponds to an operation force for the pilot clutch 80 in response to a small amount of electric current supplied to the coil 72. Therefore, although the pilot outer clutch plates 81 and the pilot inner clutch plates 82 are frictionally engaged, a slip occurs therebetween so that a torque transmitting path is not established between the first cam member 91 and the front housing 21. Likewise, although the main outer clutch plates 51 and the main inner clutch plates 52 are frictionally engaged, a slip occurs therebetween so that a torque transmitting path is not established between the first housing 21 and the inner shaft 30. That is, although frictional force is generated between the pilot outer clutch plates 81 and the pilot inner clutch plates 82, and also between the main outer clutch plates 51 and the main inner clutch plates 52, torque is not substantially transmitted from the outer case 20 to the inner shaft 30 via the main outer clutch plates 51 and the main inner clutch plates 52.

Figure 5:
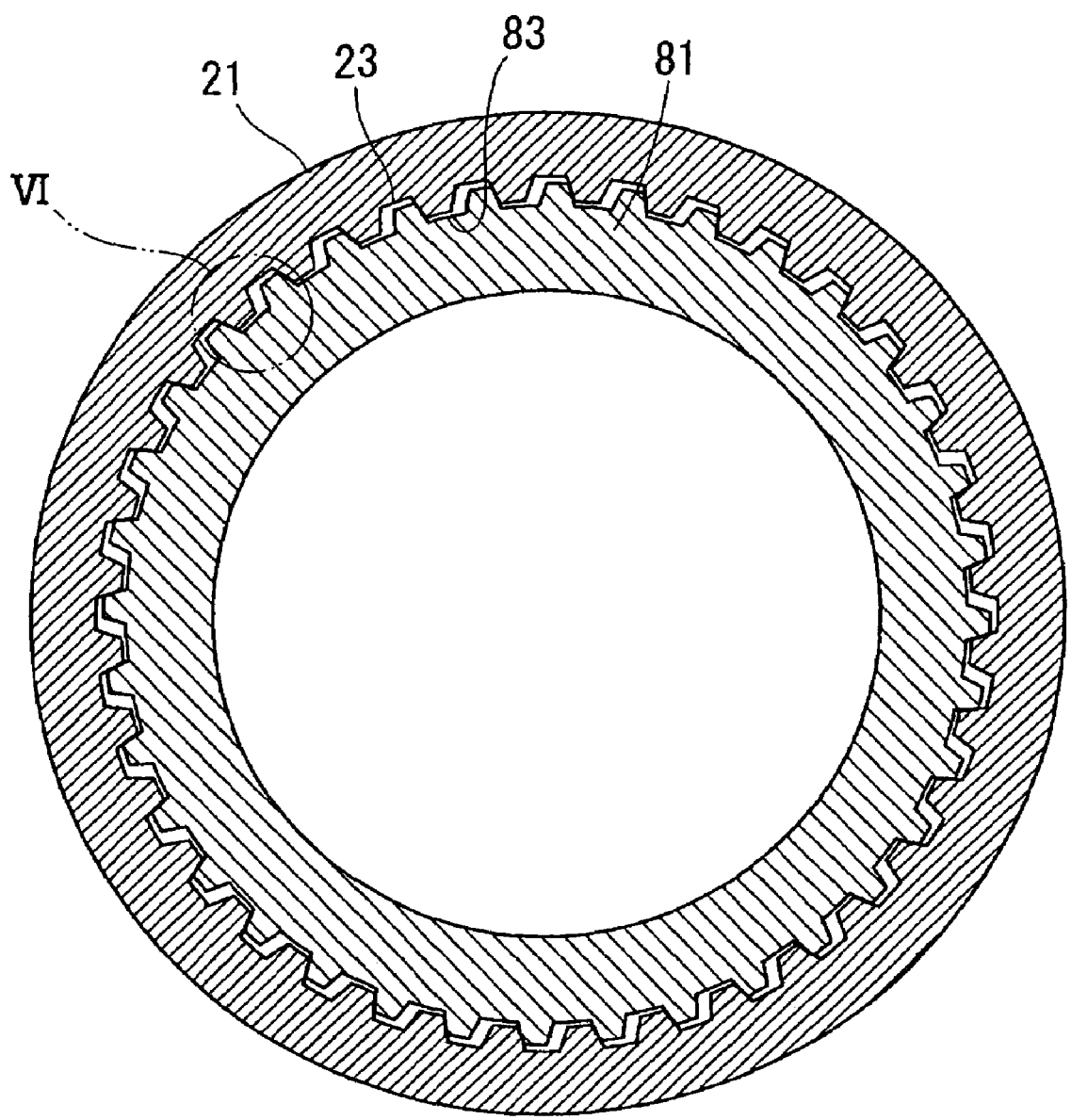
FIG. 5 is another sectional view taken along line III-III in FIG. 1 and illustrating the outer clutch plate and the outer case being in spline engagement.
Figure 6:
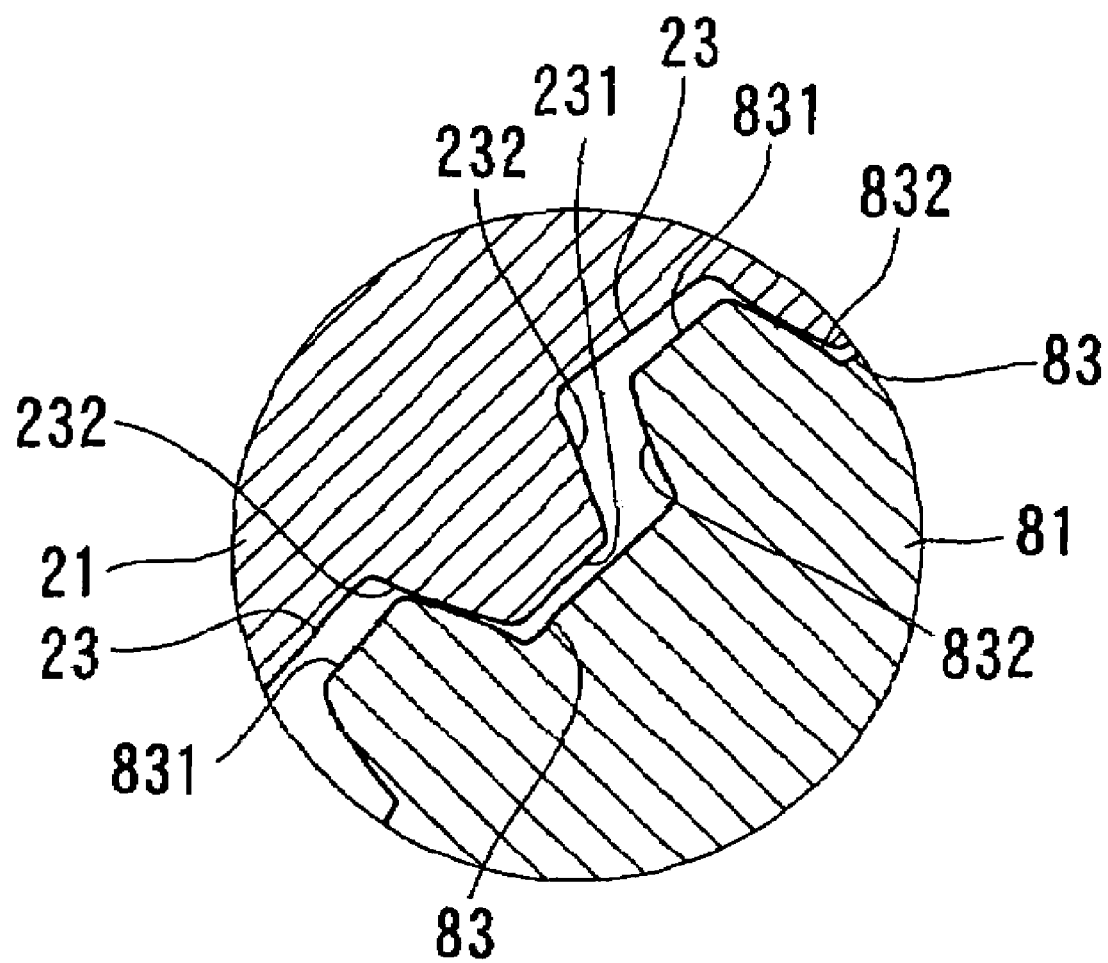
FIG. 6 is an enlarged view illustrating a portion denoted with VI in FIG. 5.

Even when a vehicle runs straight in a condition where a torque ratio, at which torque is distributed to front wheels and rear wheels, is set at 100:0, a slip may occur between a tire and a road surface due to torque transmitted to main drive wheels (front wheels). This may on occasions result in a different rotational number between the main outer clutch plate 51 fitted into the outer case 20 and the main inner clutch plate 52 fitted into the inner shaft 30. Therefore, a frictional force is generated between the main outer clutch plates 51 and the main inner clutch pates 52 and also between the pilot outer clutch plates 81 and the pilot inner clutch plates 82. As a result, as illustrated in FIGS. 5 and 6, the splines 83 of the pilot outer clutch plates 81 impact the splines 23 of the outer case 20.

As described above, the splines 83 of each pilot outer clutch plate 81 are formed to be involute splines as well as the splines 23 of the outer case 20, and so a centering force is applied to the splines 83 and 23. Therefore, once a frictional force is generated between the pilot outer clutch plates 81 and the pilot inner clutch plates 82, the centering force, which is characteristic of an involute spline, positions the pilot outer clutches 82 in such a manner that the pilot outer clutches 82 are normally coupled with the outer case 20 coaxially. Likewise, a centering force is applied to a spline engagement portion between the pilot inner clutch plates 82 and the first cam member 91. Therefore, the centering force positions the pilot inner clutch plates 82 in such a manner that the pilot inner clutch plates 82 are normally coupled with the first cam member 91 coaxially.

Further, as described above, the main outer clutch plates 51 are connected to the outer case 20 via the involute splines, and the main inner clutch plates 52 are connected to the inner shaft 30 via the involute splines. Therefore, in the same manner as the pilot clutch 80, in favor of a centering force, the main clutch 50 is prevented from rotating in an eccentric manner, and rotational imbalance is effectively reduced.

As described above, according to the embodiment of the present invention, even when a torque distribution ratio is set at 100:0, the controller 11 supplies a small amount of electric current to the coil 72. Therefore, the pilot clutch 80 is engaged gradually, and yet torque is not actually transmitted from the outer case 20 to the inner shaft 30. Because the pilot clutch 80 is engaged, a small amount of frictional force is created between the pilot outer clutch plates 81 and the pilot inner clutch plates 82. As a result, the splines 83 of each pilot outer clutch plate 81 are controlled to be in spline engagement with the splines 23 of the outer case 20, and the splines of each pilot inner clutch plate 82 are controlled to be in spline engagement with the splines 93 of the first cam member 91. Further, the pilot outer clutch plates 81, the outer case 20, the pilot inner clutch plates 82 and the first cam member 91 are all formed with involute splines. Accordingly, a centering force is applied to the pilot outer clutch plates 81 and the pilot inner clutch plates 82 in such a manner that the clutch plates 81 and 82 are positioned with the splines being engaged. Therefore, the pilot outer clutch plates 81 and the pilot inner clutch plates 82 are prohibited from moving radially, so that rattling or looseness is effectively precluded and abnormal noise is reduced.

Further, according to the embodiment of the present invention, the main outer clutch plates 51 of the main clutch 50 are coupled with the outer case 20 via the involute splines, and the main inner clutch plates 52 of the main clutch 50 are coupled with the inner shaft 30 via the involute splines. Therefore, a centering force allows to fixedly position the main outer clutch plates 51 to be engaged coaxially with the splines 23 of the outer case 20, and a centering force allows to fixedly position the main inner clutch plates 52 to be engaged coaxially with the splines 31 of the inner shaft 30. Therefore, the main outer clutch plates 51 and the main inner clutch plates 52 are prohibited from moving radially, so that rattling or looseness is effectively precluded and abnormal noise is reduced.

[Modified Mode]

According to the embodiment of the present invention, the actuator unit 70 is employed as a clutch engaging means for the main clutch 50. More specifically, magnetic attraction is generated at the armature 73 in response to an electric current supply to the coil 72 so that the armature 73 is activated electromagnetically. The clutch engaging means is not limited to a device which operates by use of electromagnetic power, and the clutch engaging means can be a hydraulic actuator, which engages the main outer clutch plates 51 and the man inner clutch plates 52 by use of a hydraulic pressure, a biasing mechanism, such as a spring, which gradually engages the main outer clutch plates 51 and the main inner clutch plates 52 by use of an elastic force of an elastic member.

Further, the clutch engaging means can be represented by a fluid frictional actuator, which makes use of fluid friction and creates a frictional engagement state in at least one of the pilot clutch 80 and the main clutch 50. In this case, a frictional force of a working fluid varies depending on a temperature of the working fluid. Therefore, a frictional force of the working fluid can be controlled based on a temperature detected by a temperature detecting means, such as a temperature sensor, for detecting a temperature of the working fluid.

The driving force transmitting apparatus 10 illustrated in FIGS. 1 and 2 is mounted on a 4WD vehicle.

As described above, according to the present invention, even when the main clutch is not needed to be frictionally engaged, the main outer clutch plates and the main inner clutch plates are applied with a force, i.e., are spline engaged in such a manner that torque is not substantially transmitted between the first torque-transmitting member and the second torque-transmitting member. Each spline tooth is formed to have an approximately trapezoidal profile in a circumferential direction with a root circle being longer than a tip circle thereof. Further, a tooth contact face between the spline tooth of the main outer clutch plate and the spline tooth of the first torque-transmitting member makes a certain degree of angle relative to a radius. Therefore, the main outer clutch plates move in the axial direction coaxially with the first torque-transmitting member along the tooth contact face. Likewise, a tooth contact face between the spline tooth of the main inner clutch plate and the spline tooth of the second torque-transmitting member makes a certain degree of angle relative to a radius. Therefore, the main inner clutch plates move in the axial direction coaxially with the second torque-transmitting member along the tooth contact face. As a result, the center (center of gravity) of both main outer clutch plates and main inner clutch plates stably correspond to rotational axes of the first torque-transmitting member and the second torque-transmitting member, and so rotational imbalance is effectively reduced.

Further, the actuator unit is effectively configured with the less number of components and exhibits an improved controlling performance. Moreover, rotational imbalance of the pilot clutch, which has the pilot inner clutch plates and the pilot outer clutch plates, is effectively reduced.

Still further, each spline is formed to be an involute spline. Therefore, in favor of an automatic centering effect of the involute spline, each clutch plate is moved in the axially direction more reliably coaxially with the first torque-transmitting member and the second torque-transmitting member. Therefore, rotational imbalance is reduced more effectively.

The principles, the preferred embodiment and mode of operation of the present invention have been described in the foregoing specification. However, the invention, which is intended to be protected, is not to be construed as limited to the particular embodiment disclosed. Further, the embodiment described herein are to be regarded as illustrative rather than restrictive. Variations and changes may be made by others, and equivalents employed, without departing from the spirit of the present invention. Accordingly, it is expressly intended that all such variations, changes and equivalents that fall within the spirit and scope of the present invention as defined in the claims, be embraced thereby.

The invention claimed is:

1. A driving force transmitting apparatus, comprising:

a first torque-transmitting member having a cylindrical portion;

a second torque-transmitting member positioned inside the cylindrical portion of the first torque-transmitting member and arranged coaxially with and rotatably relative to the first torque-transmitting member;

a main clutch having a main outer clutch plate spline mated with an inner circumferential surface of the cylindrical portion of the first torque-transmitting member and a main inner clutch plate spline mated with an outer circumferential surface of the second torque-transmitting member, the main clutch being actuated to connect and disconnect a transmission of torque between the first torque-transmitting member and the second torque-transmitting member, at least one of conditions being satisfied: 1) a spline tooth of the main outer clutch plate and a spline tooth of the inner circumferential surface of the cylindrical portion of the first torque-transmitting member each having a substantially trapezoidal profile in a direction of the respective circumference of the main outer clutch plate and the cylindrical portion of the first torque-transmitting member, with a root circle of the tooth being longer than a tip circle of the tooth, and 2) a spline tooth of the main inner clutch plate and a spline tooth of the outer circumferential surface of the second torque-transmitting member each having a part trapezoidal profile in a direction of the respective circumference of the main inner clutch plate and the outer circumferential surface of the second torque-transmitting member, with a root circle of the tooth being longer than a tip circle of the tooth;

an actuator unit for actuating the main clutch to be engaged, the actuator unit including:

a pilot outer clutch plate spline mated with the inner circumferential surface of the cylindrical portion of the first torque-transmitting member, a spline tooth of the pilot outer clutch plate and a spline tooth of the inner circumferential surface of the cylindrical portion the first torque-transmitting member each having a part trapezoidal involute profile in a circumferential direction with a root circle of the tooth being longer than a tip circle of the tooth, a pilot inner clutch plate frictionally engageable with the pilot outer clutch plate, a cam mechanism spline mated with the pilot inner clutch plate and configured to convert torque transmitted by a frictional engagement between the pilot outer clutch plate and the pilot inner clutch plate to an axial directional thrust force so as to pressurize the main clutch, a spline tooth of the cam mechanism and a spline tooth of the pilot inner clutch plate each having a trapezoidal involute profile in a circumferential direction with a root circle of the tooth being longer than a tip circle of the tooth, an armature provided at one side of the pilot outer clutch plate and the pilot inner clutch plate in an axial direction, and an electromagnetic coil provided at an other side of the pilot outer clutch plate and the pilot inner clutch plate in the axial direction, wherein a controlling means controls electric current supplied to the electromagnetic coil and controls a force for frictionally engaging the pilot inner clutch plate with the pilot outer clutch plate; and the controlling means judges based on a driving condition of a vehicle whether an engagement of the main clutch is necessary or not and controlling the actuator unit so as to actuate the main clutch when the engagement of the main clutch is judged to be necessary, the controlling means further controlling the actuator unit so as to pressurize the pilot outer clutch plate and the pilot inner clutch plate to be frictionally engaged with slippage when the engagement of the main clutch is judged not to be necessary, in such a manner that the pilot outer clutch plate is centered with the cylindrical portion of the first torque-transmitting member and the pilot inner clutch plate is centered with the cam mechanism, but torque is not substantially transmitted between the first torque-transmitting member and the second torque-transmitting member.

\* \* \* \* \*